(12) United States Patent
Baker et al.

(10) Patent No.: US 11,560,260 B2
(45) Date of Patent: Jan. 24, 2023

(54) PACKAGING CONTAINER HAVING A SECURE CLOSURE AND RETENTION ELEMENTS

(71) Applicants: Jay Baker, Mayville, NY (US); Jessup Baker, Brocton, NY (US)

(72) Inventors: Jay Baker, Mayville, NY (US); Jessup Baker, Brocton, NY (US)

(*) Notice: Subject to any disclaimer, the term of this patent is extended or adjusted under 35 U.S.C. 154(b) by 0 days.

(21) Appl. No.: 16/826,471

(22) Filed: Mar. 23, 2020

(65) Prior Publication Data
US 2021/0292052 A1    Sep. 23, 2021

(51) Int. Cl.
| | |
|---|---|
| *B65D 43/22* | (2006.01) |
| *B65D 43/02* | (2006.01) |
| *B65D 1/26* | (2006.01) |
| *B65D 25/10* | (2006.01) |
| *B65D 43/26* | (2006.01) |
| *B65D 43/16* | (2006.01) |
| *A01M 23/16* | (2006.01) |

(52) U.S. Cl.
CPC ......... *B65D 43/0212* (2013.01); *A01M 23/16* (2013.01); *B65D 1/26* (2013.01); *B65D 25/10* (2013.01); *B65D 43/162* (2013.01); *B65D 43/26* (2013.01); *B65D 2543/00194* (2013.01); *B65D 2543/00296* (2013.01); *B65D 2543/00527* (2013.01); *B65D 2543/00537* (2013.01); *B65D 2543/00694* (2013.01); *B65D 2543/00805* (2013.01)

(58) Field of Classification Search
CPC ...... B65D 43/26; B65D 43/22; B65D 43/162; B65D 43/0212; B65D 25/10; B65D 1/26

USPC .......................................................... 206/1.5
See application file for complete search history.

(56) References Cited

U.S. PATENT DOCUMENTS

| | | | | |
|---|---|---|---|---|
| 6,644,494 B2* | 11/2003 | Hayes | ................ | B65D 21/0219 206/508 |
| 7,597,206 B2* | 10/2009 | Atkins | ..................... | B65D 1/36 220/324 |
| 8,381,944 B2* | 2/2013 | Strange | ................ | B65D 43/162 220/793 |
| 2015/0225139 A1* | 8/2015 | Baker | .................. | B65D 25/108 206/45.24 |
| 2015/0225140 A1* | 8/2015 | Baker | .................. | B65D 43/162 220/315 |

* cited by examiner

*Primary Examiner* — Steven A. Reynolds
(74) *Attorney, Agent, or Firm* — The Bilicki Law Firm, PC

(57) ABSTRACT

A thermoformed packaging container includes a base section having a bottom surface, first and second inner and outer base side walls, and first and second inner and outer base end walls forming a chamber, with at least one outer base one side wall having a plurality of base indentations and protrusions formed therein. A cover section having a top surface, first and second cover side walls, and first and second cover end walls, the cover section adapted to cover the base section when in a closed state, with at least one of the cover side walls having a plurality of cover indentations and protrusions formed therein for engaging with the plurality of base indentations and protrusions. The container also includes a closure mechanism for securing the container in a closed position, wherein the closure mechanism is formed within at least one end wall of the base section and a corresponding end wall of the cover section.

15 Claims, 16 Drawing Sheets

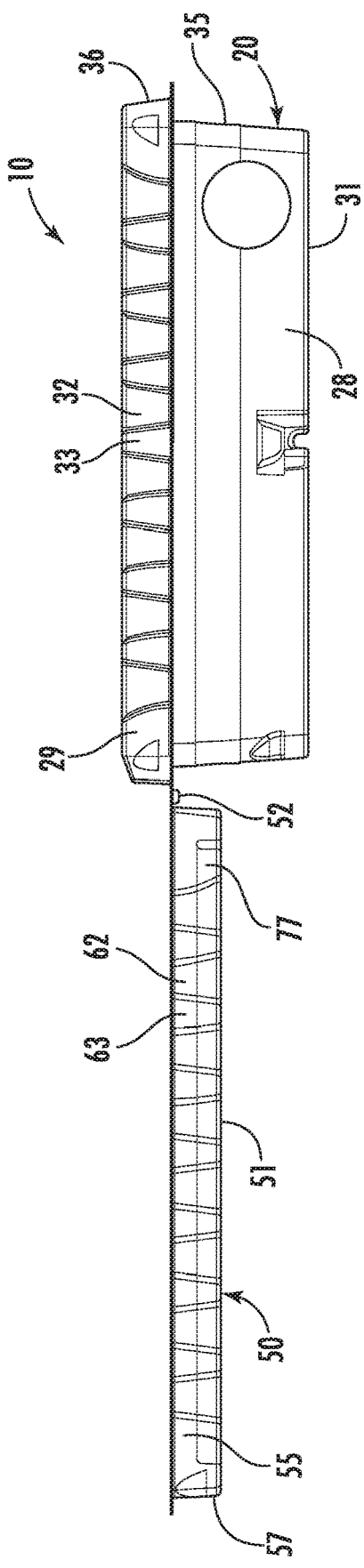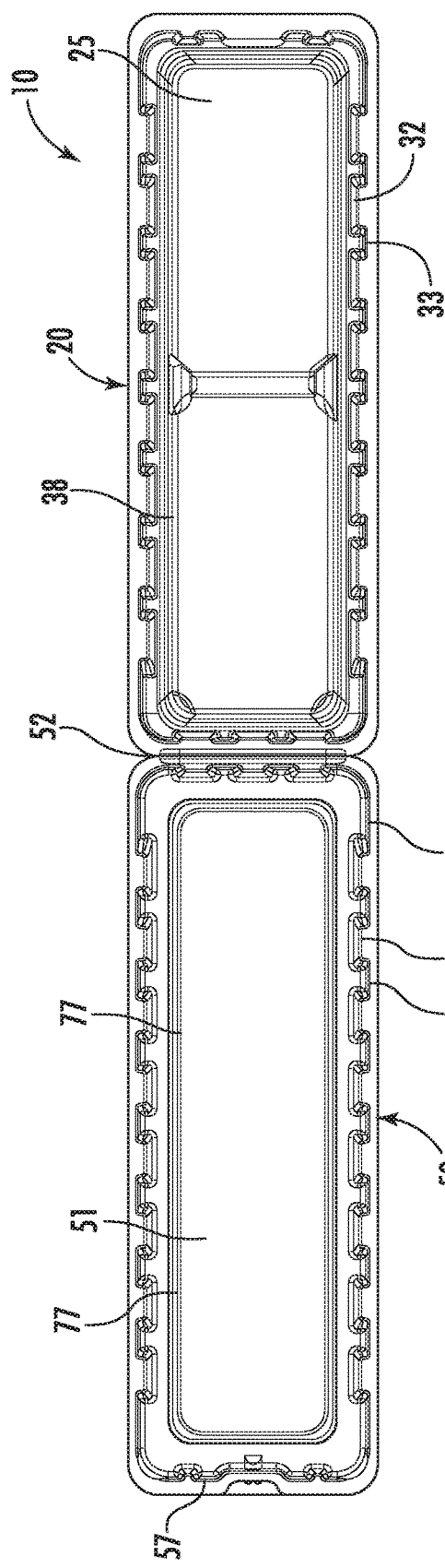

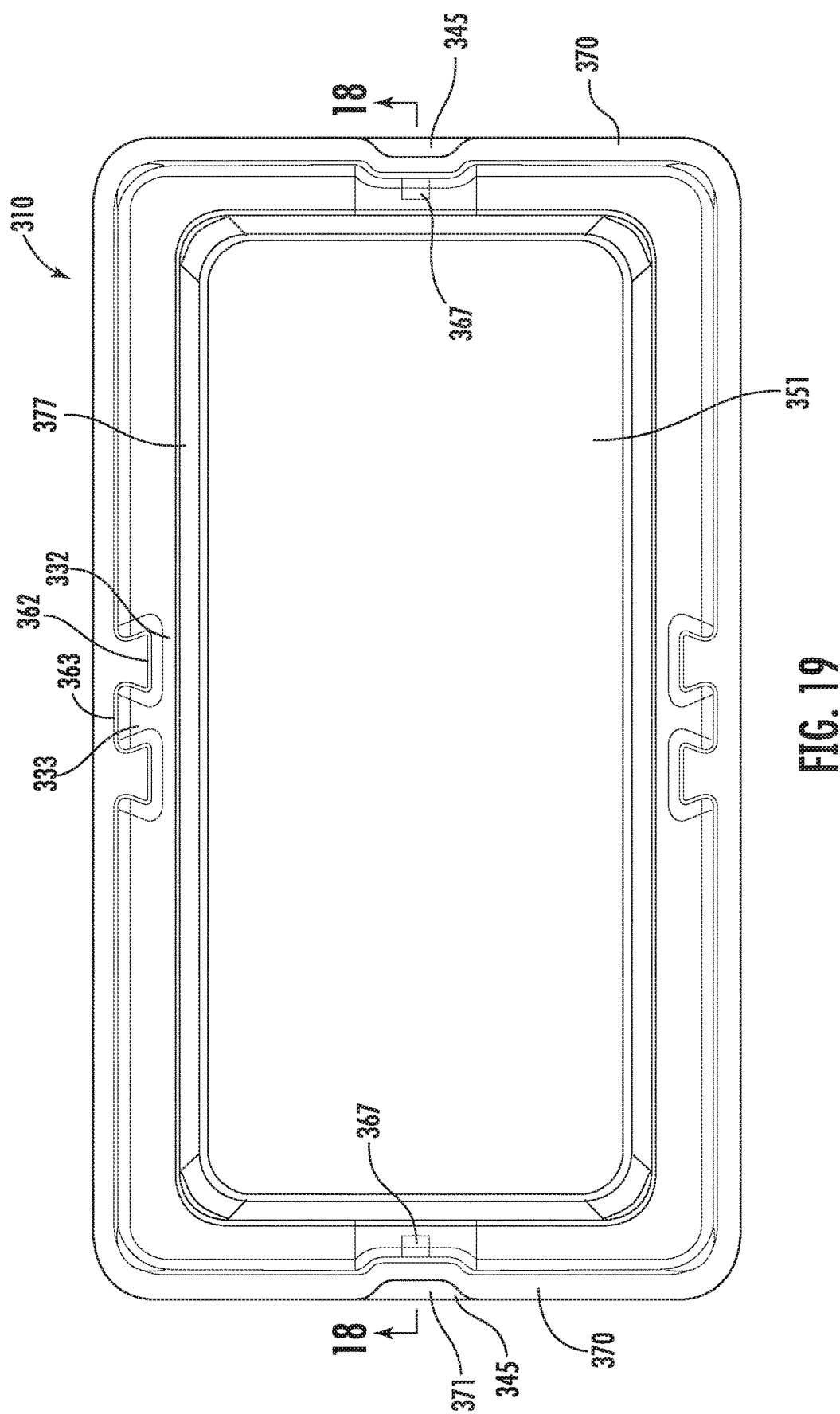

PACKAGING CONTAINER HAVING A SECURE CLOSURE AND RETENTION ELEMENTS

FIELD OF THE INVENTION

The present invention relates to thermoformed packaging containers, more specifically, to packaging containers having a secure closure and retention elements for retaining an object within the container.

BRIEF SUMMARY

A thermoformed packaging container includes a base section having a bottom surface, first and second inner and outer base side walls, and first and second inner and outer base end walls forming a chamber, with at least one outer base one side wall having a plurality of base indentations and protrusions formed therein; a cover section having a top surface, first and second cover side walls, and first and second cover end walls, the cover section adapted to cover the base section when in a closed state, with at least one of the cover side walls having a plurality of cover indentations and protrusions formed therein for engaging with the plurality of base indentations and protrusions; and a closure mechanism for securing the container in a closed position, wherein the closure mechanism is formed within at least one end wall of the base section and a corresponding end wall of the cover section. Each of the first and second outer base side walls, and first and second outer base end walls has a deformable flange extending therefrom, and the closure mechanism includes at least one outer aperture formed within at least one of the outer base end walls and at least one inner aperture formed within at least one inner base end wall aligned with the at least one outer aperture, at least one projection extending inwardly from at least one cover end wall for engaging the at least one outer aperture and being adapted to engage the at least one inner aperture of the base section, the closure and release mechanism retaining the cover section over the base section and securing the packaging container in a closed position and wherein the at least one projection is released from the at least one inner aperture and the at least one inner aperture by depressing the deformable flange, thereby opening the packaging container.

BRIEF DESCRIPTION OF THE DRAWINGS

FIG. 1 is a side view of a packaging container according to an embodiment of the present invention, in which the packaging container is opened.

FIG. 2 is a top view of the packaging container of FIG. 1 in an open configuration.

FIG. 19 is a top view of the packaging container of FIG. 18 in a closed configuration.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

Figure 3:
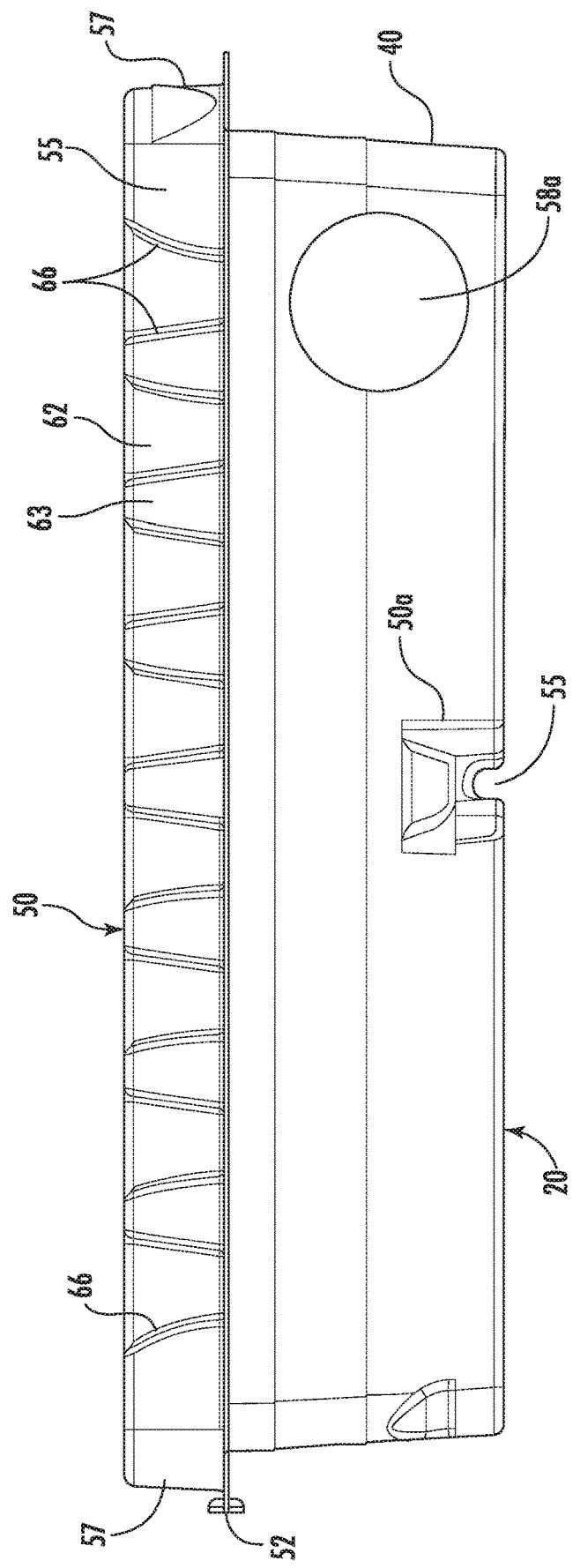
FIG. 3 is a side view of the packaging container of FIG. 1 in a closed configuration.
Figure 4:
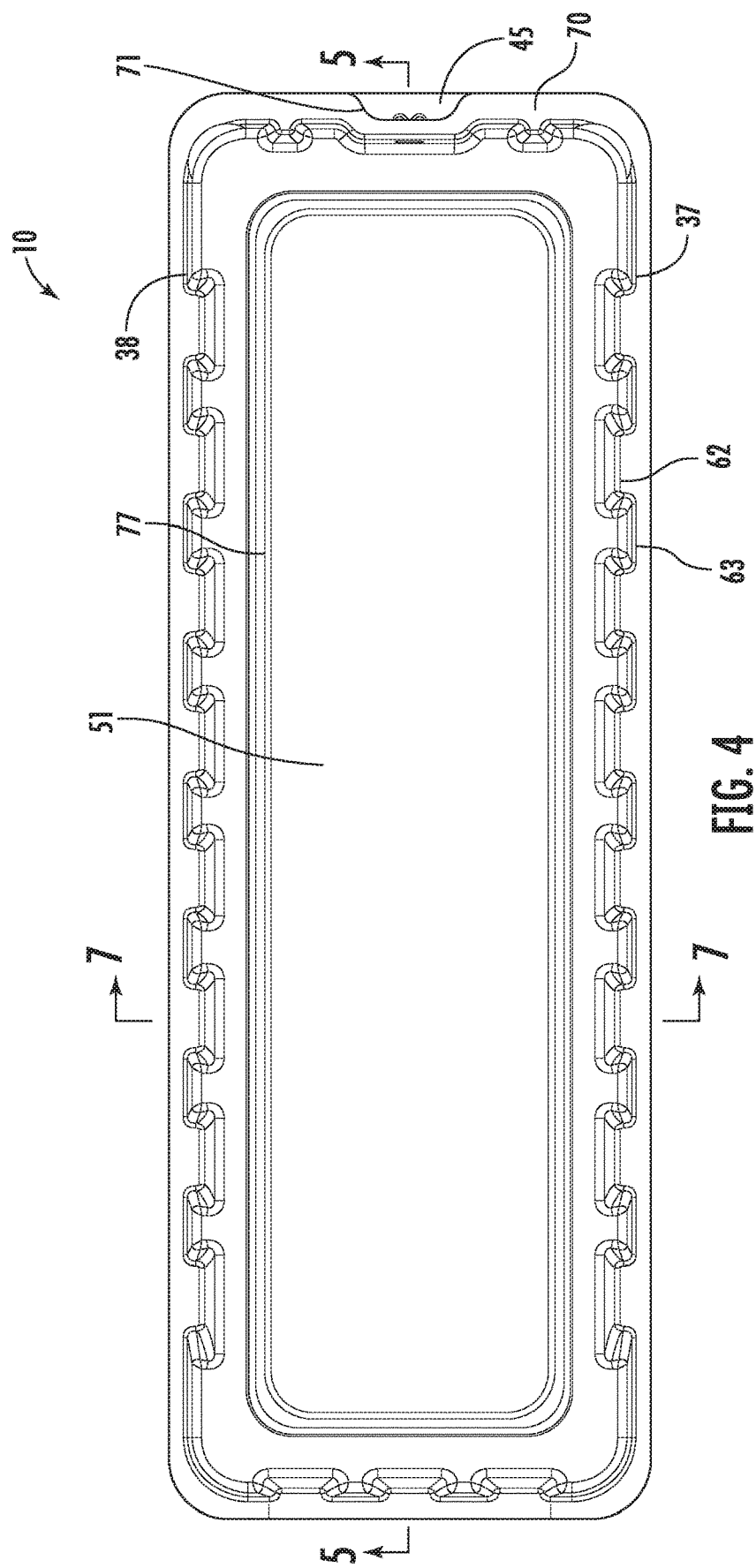
FIG. 4 is a top view of the packaging container of FIG. 1, in which the packaging container is closed.
Figure 5:
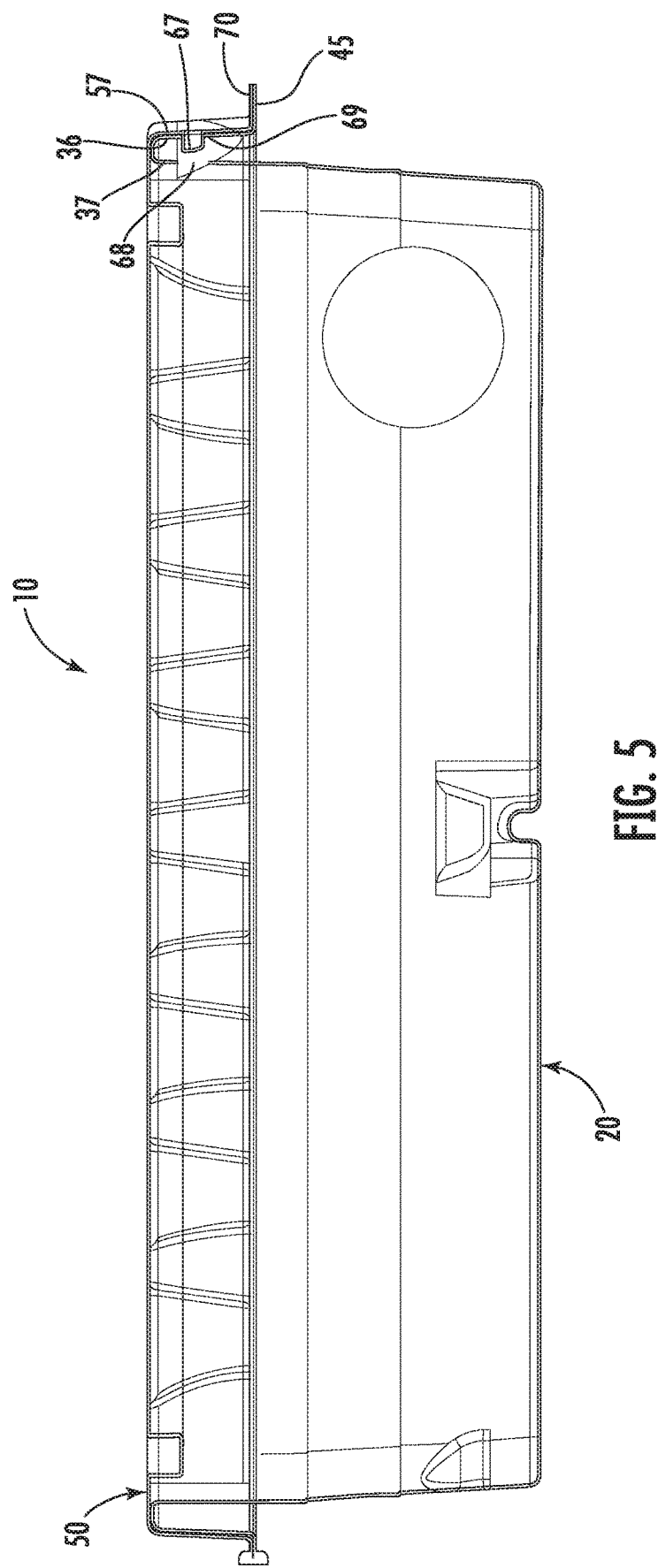
FIG. 5 is a cross-sectional view the packaging container of FIG. 4.
Figure 6:
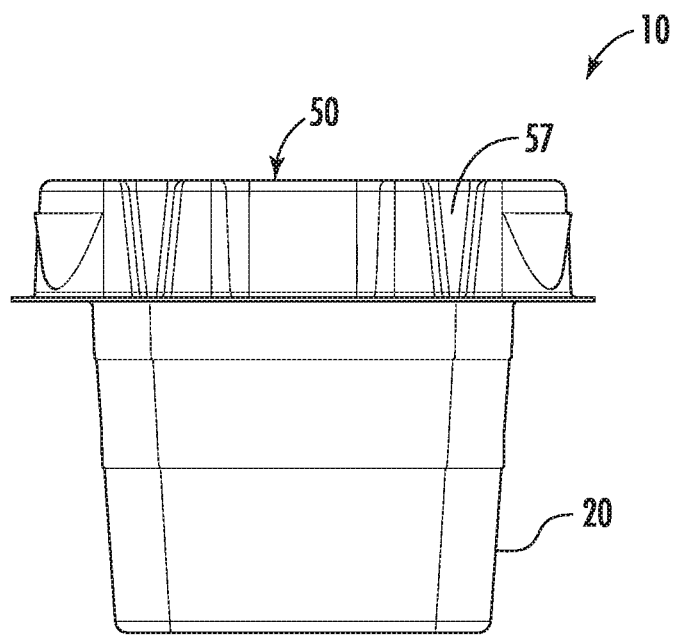
FIG. 6 is an end view of the packaging container of FIG. 1 in a closed state.
Figure 7:
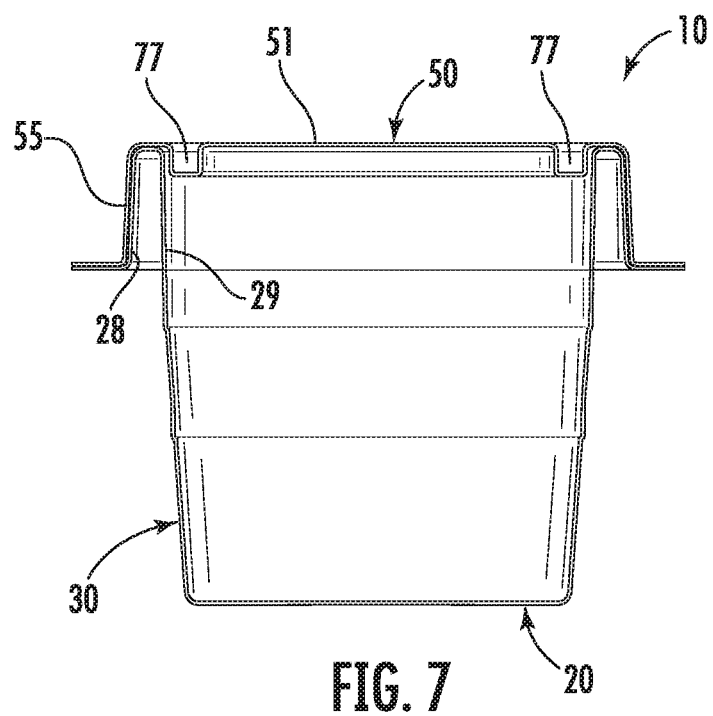
FIG. 7 illustrates cross sectional view of the container of FIG. 6.

In accordance with the present embodiments of a packaging container, FIG. 1 illustrates a side view of a packaging container 10, in which container 10 is opened to accommodate desired contents. FIG. 2 is a top view of container 10 in an open configuration. Further. FIG. 3 is a side view of container and FIG. 4 is a top view of container 10 in a closed configuration. FIG. 5 is a cross-sectional view of container 10. Further, FIG. 6 is an end view of container 10 and FIG. 7 is a cross-sectional end view.

With reference to FIGS. 1 and 2, packaging container 10 includes a base section 20 having a bottom surface 31, first and second inner and outer base side walls, 28 and 29, and first and second inner and outer base end walls. 35 and 36, forming a chamber 25. Outer base side walls 29 and outer base end walls 36 are spaced apart from inner base side walls 28 and inner base end walls 37 and extend only a portion of the height of inner base side walls 28 and inner base end walls 37. Outer base side walls 29 and outer base end walls 36 may include a plurality of indentations 32 and protrusions 33.

Packaging container 10 also includes a cover section 50 pivotally coupled to base section 20. Cover section 50 is configured to pivot about hinge 52 between an open state and a closed state. In particular, cover section 50 includes a top surface 51 having a recessed channel 77, first and second side walls 55, and first and second end walls 57. Cover section 50 fits over base section 20. Cover section 50 also includes a plurality of indentions 62 and protrusions 63 formed therein for engaging with indentions and protrusions 32 and 33 of base section 20.

When a hinge 52 is activated in order to close lid 50 onto base section 20, indentations and protrusions 62, 63 of cover section 50 meet with indentations and protrusions 32, 33 of base section 20. Each indentation 62 of cover 50 fits into a corresponding protrusion 33 on base section 50 and each protrusion 63 of cover 50 fits into a corresponding indentation 22 of base section 20. Thus, when cover 50 is closed onto base section 20, protrusions 32 and 62 and indentations 33 and 63 form a zippered relationship between base section 20 and cover 50. As shown in FIG. 3, cover indentations and protrusions 62, 63 and base indentations and protrusions 32, 33 have actuate side walls, as indicated at 66, when positioned closer to ends 36 (36 is not shown in FIG. 3) and 57 to allow for a smooth closure of container 10. The degree of curvature is greater closer to outer base end walls 36 (not shown in FIG. 3) and cover end walls 57, as can be seen in at least FIGS. 1 and 3.

The zippered relationship of indentations and protrusions 32, 33 and 62, 63 not only aids in maintaining cover 50 securely fastened onto base section 20, it contributes to the overall strength of container 10. That is, upon applying lateral pressure to one or more of outer base side walls 29, lid 50 is not released and container 10 is not easily opened due to the function of the indentations and protrusions. Thus, the zippered relationship between base section 20 and cover 50 contributes to the overall tamper-proof qualities of container 10.

A closure and release mechanism is also included in packaging container 10 to work in conjunction with the indentations and protrusions. As shown in FIG. 5, a post 67 projects inwardly from cover end wall 57. In one embodiment, post 67 includes an angled edge and a top edge. Post 67 is adapted to engage corresponding inner and outer apertures 68 and 69 of base section 20. A peripheral flange 70 extends horizontally from a perimeter of cover section 50 such that, when packaging container 10 is in a closed position, peripheral flange 70 abuts a flange 45 of base section 20. Peripheral flange 70 includes a cut out area 71, as shown in FIG. 4, to allow access for opening container 10.

Laterally extending flange 45 is deformable such that when flange 45 is depressed adjacent to cut out area 71, outer base end wall 36 and inner base end wall 35 move inwardly away from cover end wall 57, thereby releasing post 67 from apertures 68 and 69 and opening packaging container 10. Cut out area 71 provides unobstructed access for depressing deformable flange 45 for opening packaging container 10.

As shown in FIGS. 4, 5 and 7, container 10 includes a recessed channel 77 formed in cover 50 for providing structural support to container 10. Alternatively, top surface 51 of cover 50 may be recessed to provide structural support. Lettering (not shown) on top surface 51 may also provide additional structural support. Recessed channel 77 functions to prevent outer base side walls 28 and inner base side walls 29 from being pushed inward away from cover side wall 55, thereby preventing a deflection of the side walls and release of the indentations and protrusions. Further, in some embodiments, recessed channel 77 may extend to a depth that prevents deflection of outer base end wall 36 and inner base end wall 37. The recessed channel 77 would function as an obstructive member that would prevent the container from opening via depression of flange 45 and deflection of walls 36 and 37. This would essentially result in a container that must be destroyed in order to be opened. That is, if recessed channel 77 extends adjacent to aperture 69 of inner base end wall 37, movement of inner base end wall 37 is hindered by recessed channel 77. Therefore, post 67 is not released from apertures 68 and 69 and cover section 50 remains secured in a closed position over base section 20.

Figure 8:
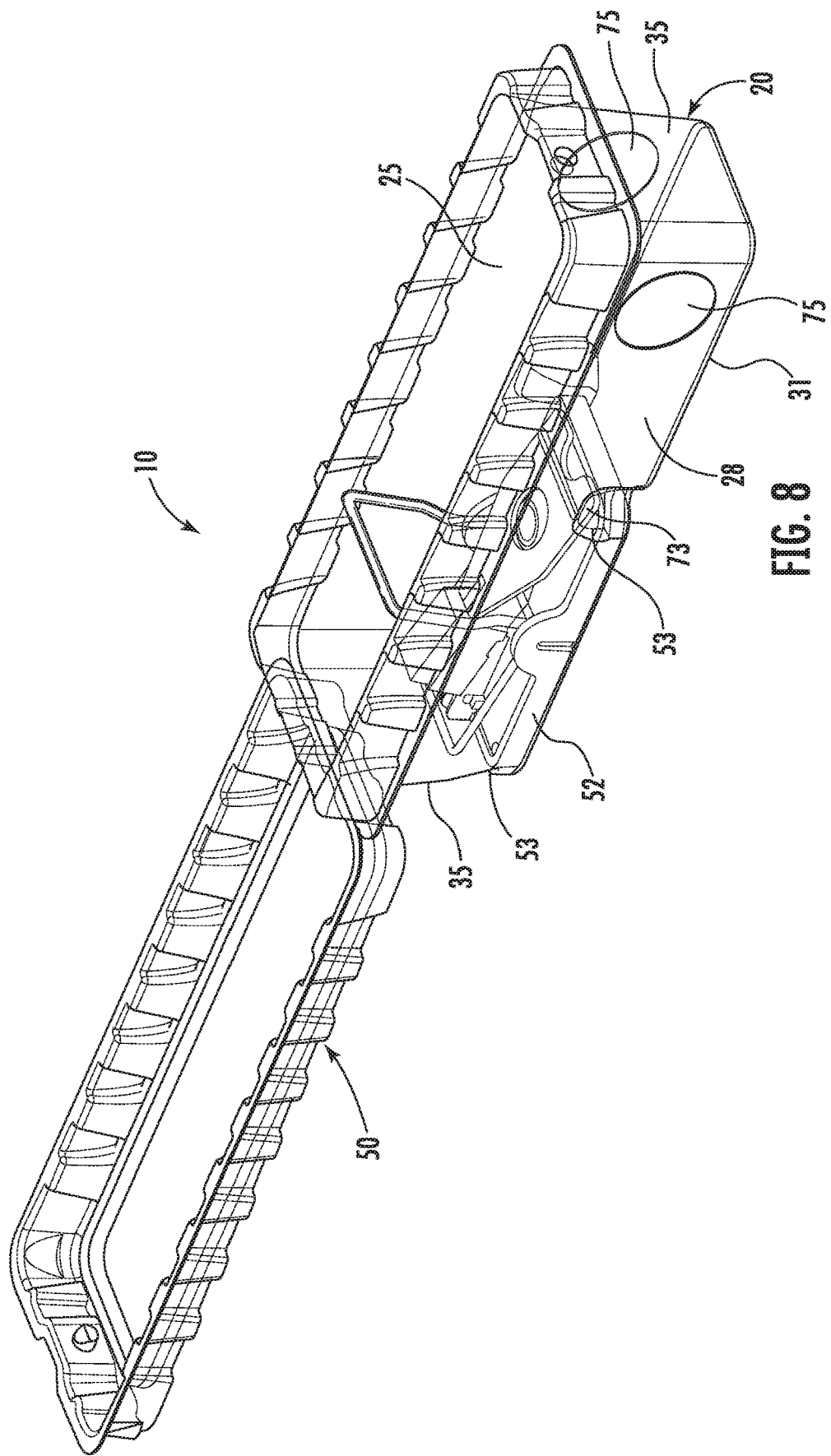
FIG. 8 is a perspective view of the packaging container in an open configuration, retaining a mouse trap.
Figure 9:
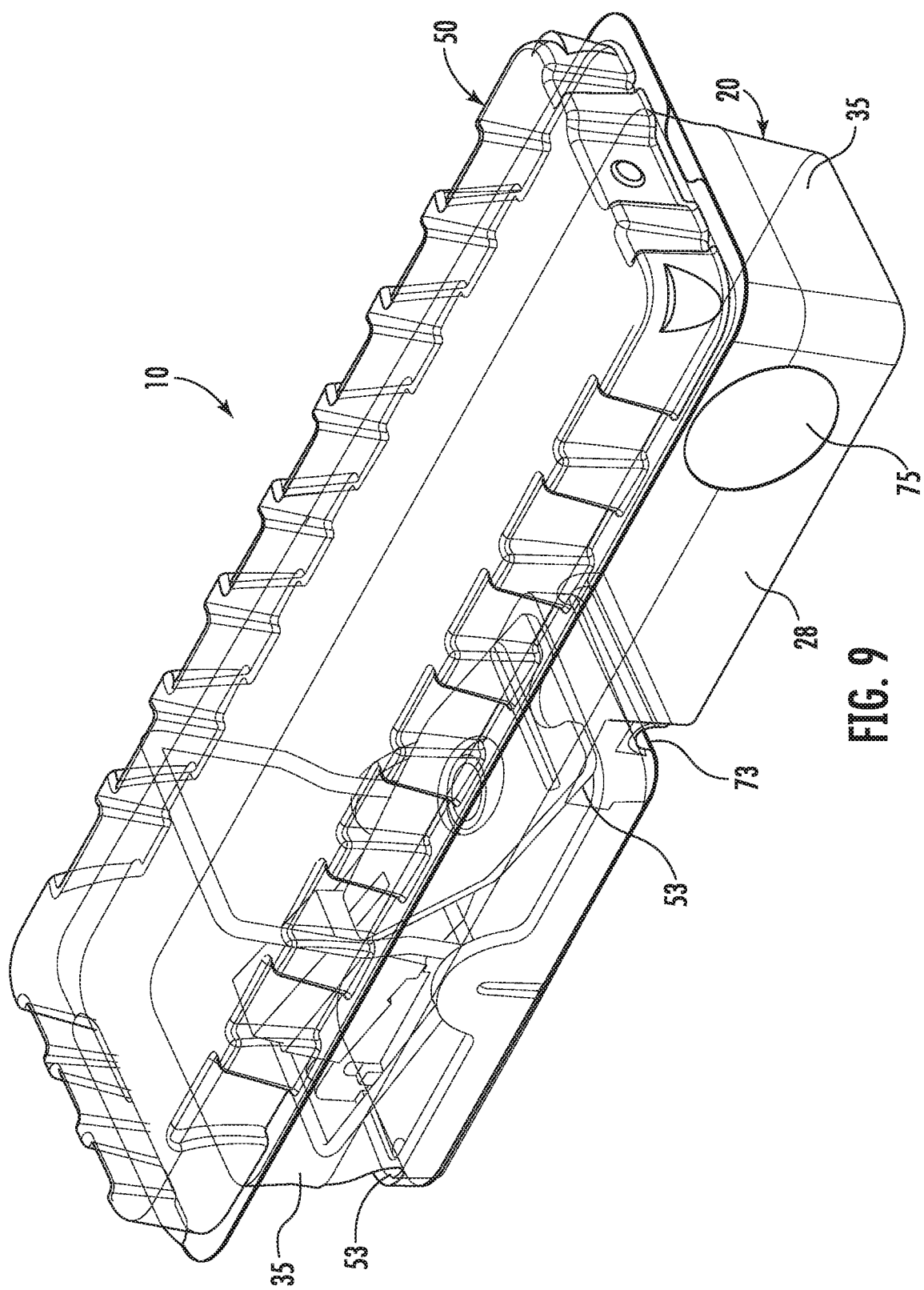
FIG. 9 is a perspective view of the packaging container in a closed configuration, retaining a mouse trap.

As illustrated in FIGS. 8 and 9, base section 20 is adapted to retain an object 52 such as a trapping mechanism for the trapping of rodents or other pests. Object 52 is retained against bottom surface 31 of base section 20 via a snap-in mechanism including a plurality of detents, each of which is indicated at 53, and formed within the chamber 25 of base section 20. Detents 53 are formed along inner base side walls 28 and inner base end walls 35. The snap-in mechanism of base section 20 also includes a retaining rib 73 formed in bottom wall 31 of base section 20. The snap-in mechanism including retaining detents 53 and retaining rib 73 is configured to prevent movement of object 52 within base section 40.

Container 10 may also comprise one or more cut-out portions 75 formed on one or more of inner base side walls 28, which may provide an entrance point for pests such as rodents. Cut-out portions 75 may be of any known shape including circular, rectangular, square, or the like. Base section 20 may also contain bait to lure rodents or other pests into container 10 by way of cut-out portions 75.

Figure 10:
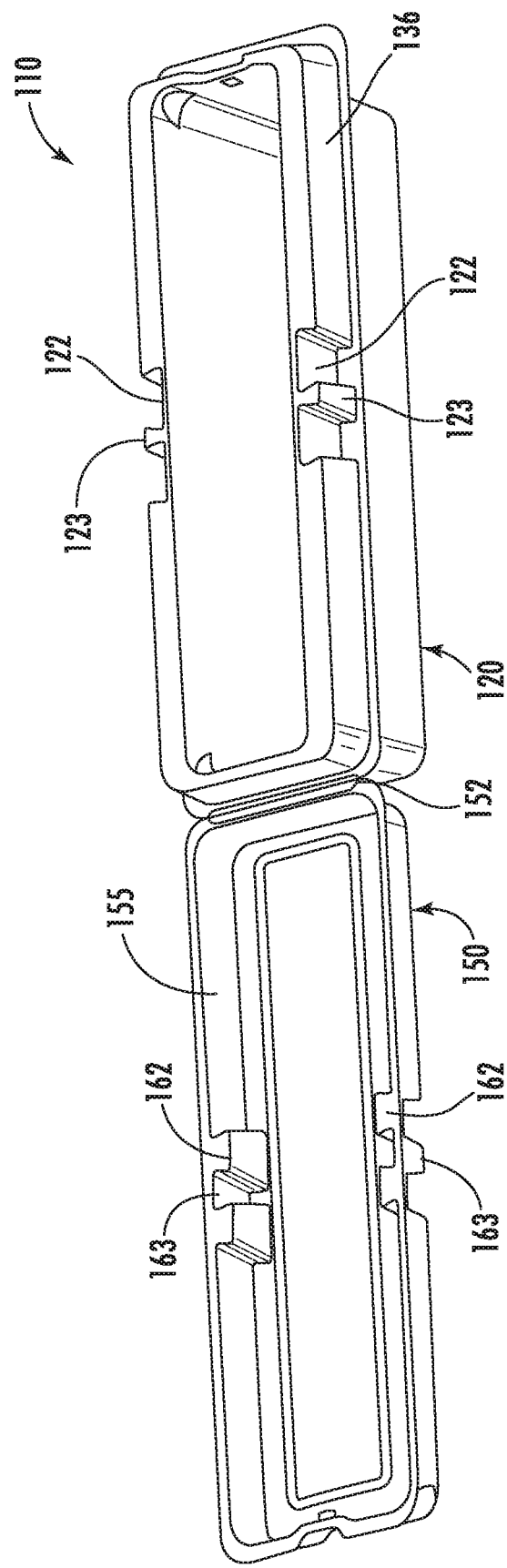
FIG. 10 is an alternate configuration of a packaging container in an open configuration.
Figure 11:
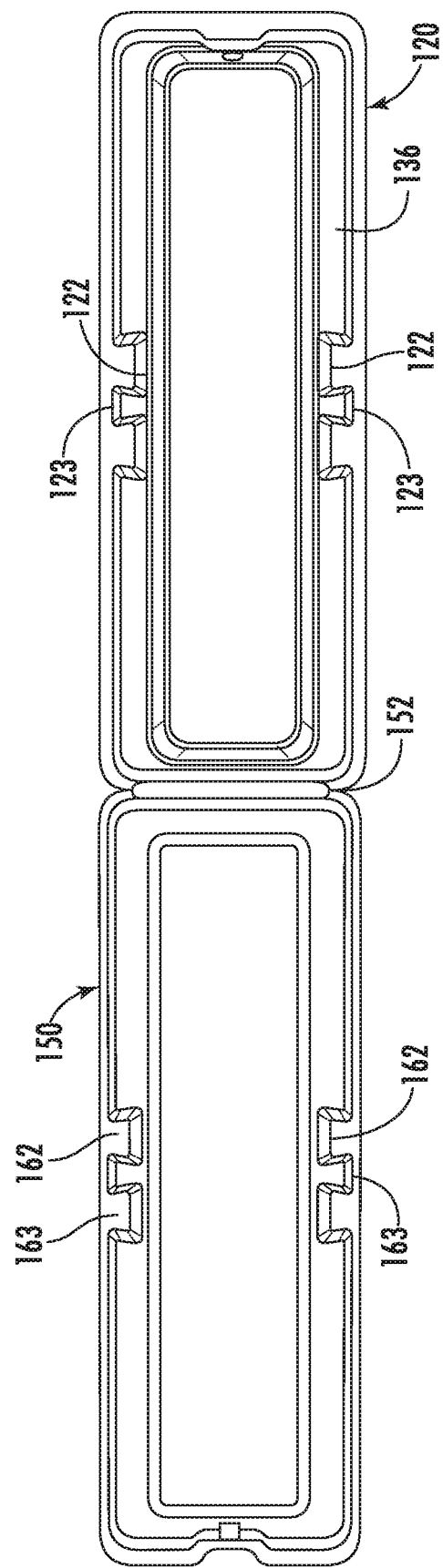
FIG. 11 is a top view of the packaging container of FIG. 10 in an open configuration.
Figure 12:
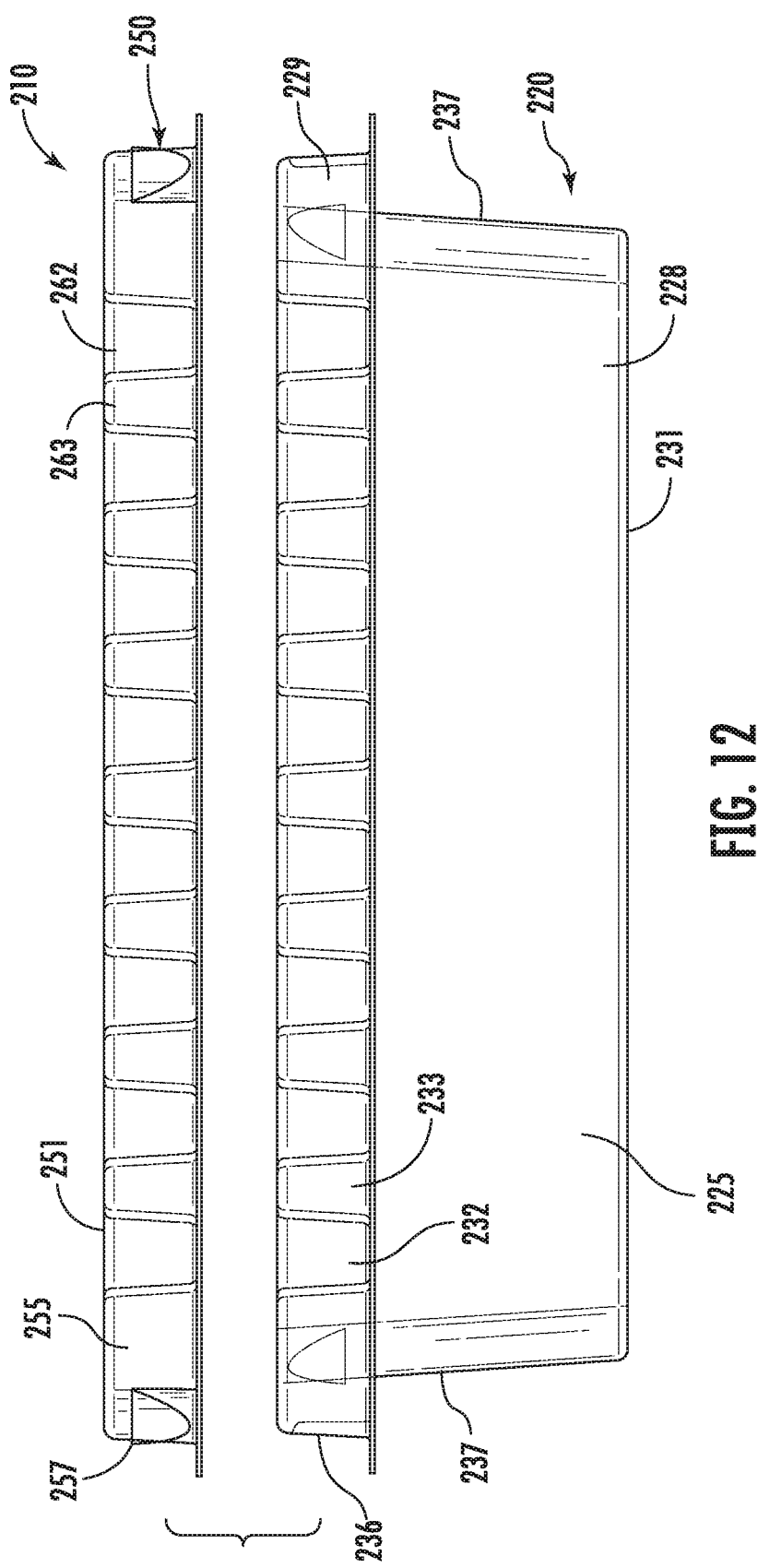
FIG. 12 is a side view of an alternate embodiment of a packaging container in an open state.
Figure 13:
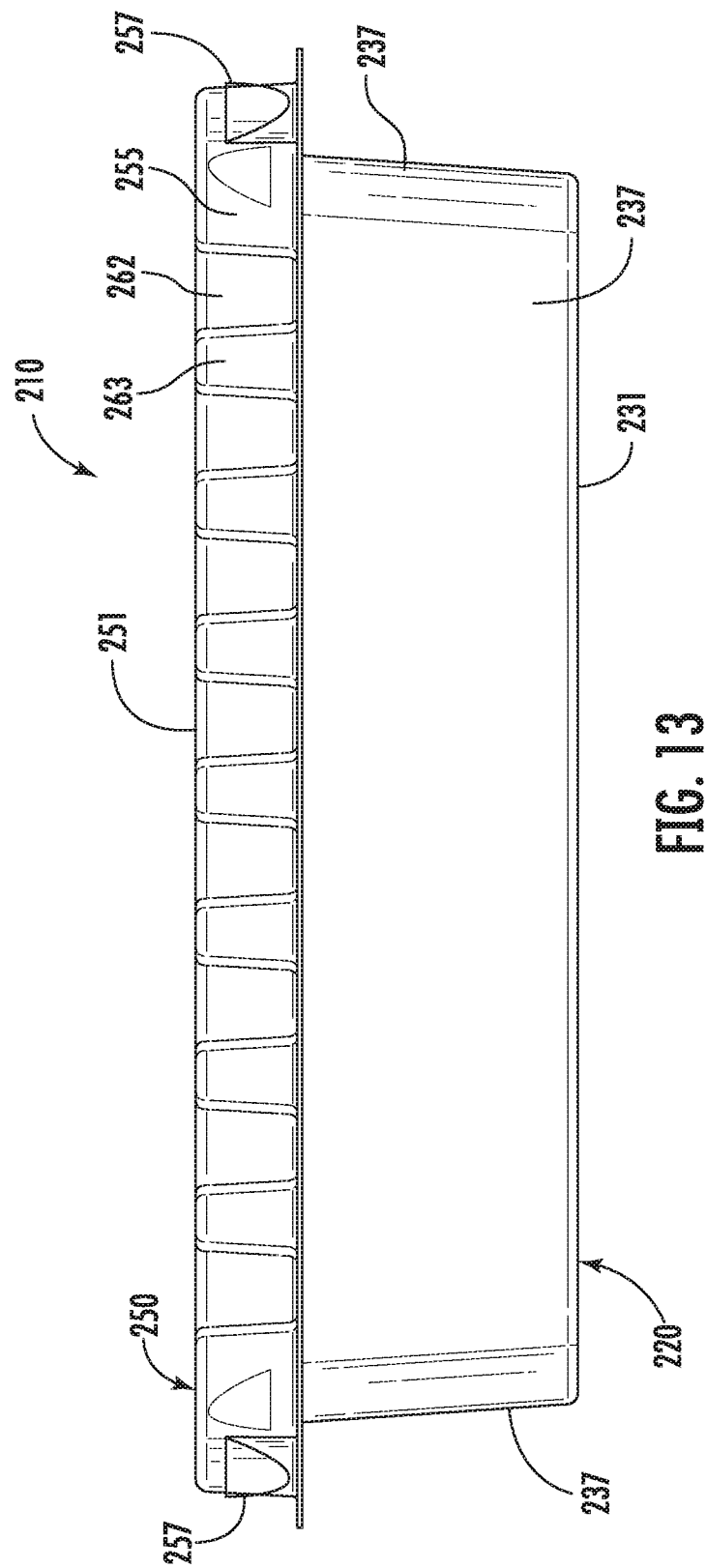
FIG. 13 is a side view of the packaging container of FIG. 12 in a closed state.

Further embodiments may include fewer or more indentations and protrusions, such as packaging container 110, as shown in FIGS. 10-11. Packaging container 110 includes elements corresponding to those described with respect to container 10 and will not be repeated herein. However, packaging container 110 includes base 120 with outer base side walls 136 having a pair of indentations 122 and a single protrusion 123. Similarly, cover section 150 includes protrusions 163 and a corresponding indentation 162 formed in cover side walls 155 for engaging with indentations and protrusions 122 and 123 of base 120.

As discussed above, with respect to container 10, when hinge 152 is activated in order to close lid 150 onto base section 120, indentations and protrusions 162, 163 of cover section 150 meet with indentations and protrusions 132, 133 of base section 120. Each indentation 162 of cover 150 fits into a corresponding protrusion 133 on base section 150 and each protrusion 163 of cover 150 fits into a corresponding indentation 122 of base section 120. Thus, when cover 150 is closed onto base section 120, protrusions 132 and 162 and indentations 133 and 163 form a zippered relationship between base section 120 and cover 150 when container 110 is in a closed state. Cover indentations and protrusions 162, 163 and base indentations and protrusions 132, 133 may have actuate side walls, but may also have straight walls. The degree of curvature is greater closer to outer base end walls 136 and cover end walls 157 (not shown in FIG. 10 or 11). It should be understood that greater or fewer indentations and protrusions may be used.

The zippered relationship of indentations and protrusions 132, 133 and 162, 163 not only aids in maintaining cover 150 securely fastened onto base section 120, it contributes to the overall strength of container 110. That is, upon applying lateral pressure to section 130b (not shown in FIG. 10 or 11) of base section 120, container 110 is not easily opened due to the function of the indentations and protrusions. Thus, the zippered relationship between base section 120 and cover 150 contributes to the overall tamper-proof qualities of container 110.

An additional embodiment is shown in FIGS. 12-17, wherein a packaging container 210 includes a base portion 220 and a separate cover portion 250. Base section 220 includes a bottom surface 231, first and second inner and outer base side walls. 228 and 229, and first and second inner and outer base end walls. 235 and 236, forming a chamber 225. Outer base side walls 229 and outer base end walls 236 are spaced apart from inner base side walls 228 and inner base end walls 237 and extend only a portion of the height of inner base side walls 228 and inner base end walls 237.

Outer base side walls 229 and outer base end walls 236 may include a plurality of indentations 232 and protrusions 233.

Packaging container 210 also includes a cover section 250 pivotally coupled to base section 220. In particular, cover section 250 includes a top surface 251 having a recessed channel 277, first and second side walls 255, and first and second end walls 257. Cover section 250 fits over base section 220. Cover section 250 also includes a plurality of indentions 262 and protrusions 263 formed therein for engaging with indentions and protrusions 232 and 233 of base section 220.

When cover section 250 is placed over base section 220, indentations and protrusions 262, 263 of cover section 250 meet with indentations and protrusions 232, 233 of base section 220. Each indentation 262 of cover 250 fits into a corresponding protrusion 233 on base section 220 and each protrusion 263 of cover 250 fits into a corresponding indentation 222 of base section 220. Thus, when cover 250 is closed onto base section 220, protrusions 232 and 262 and indentations 233 and 263 form a zippered relationship between base section 220 and cover 250.

The zippered relationship of indentations and protrusions 232, 233 and 262, 263 not only aids in maintaining cover 250 securely fastened onto base section 220, it contributes to the overall strength of container 210. That is, upon applying lateral pressure to one or more of outer base side walls 229, lid 250 is not released and container 210 is not easily opened due to the function of the zipper. Thus, the zippered relationship between base section 220 and cover 250 contributes to the overall tamper-proof qualities of container 210.

Figure 14:
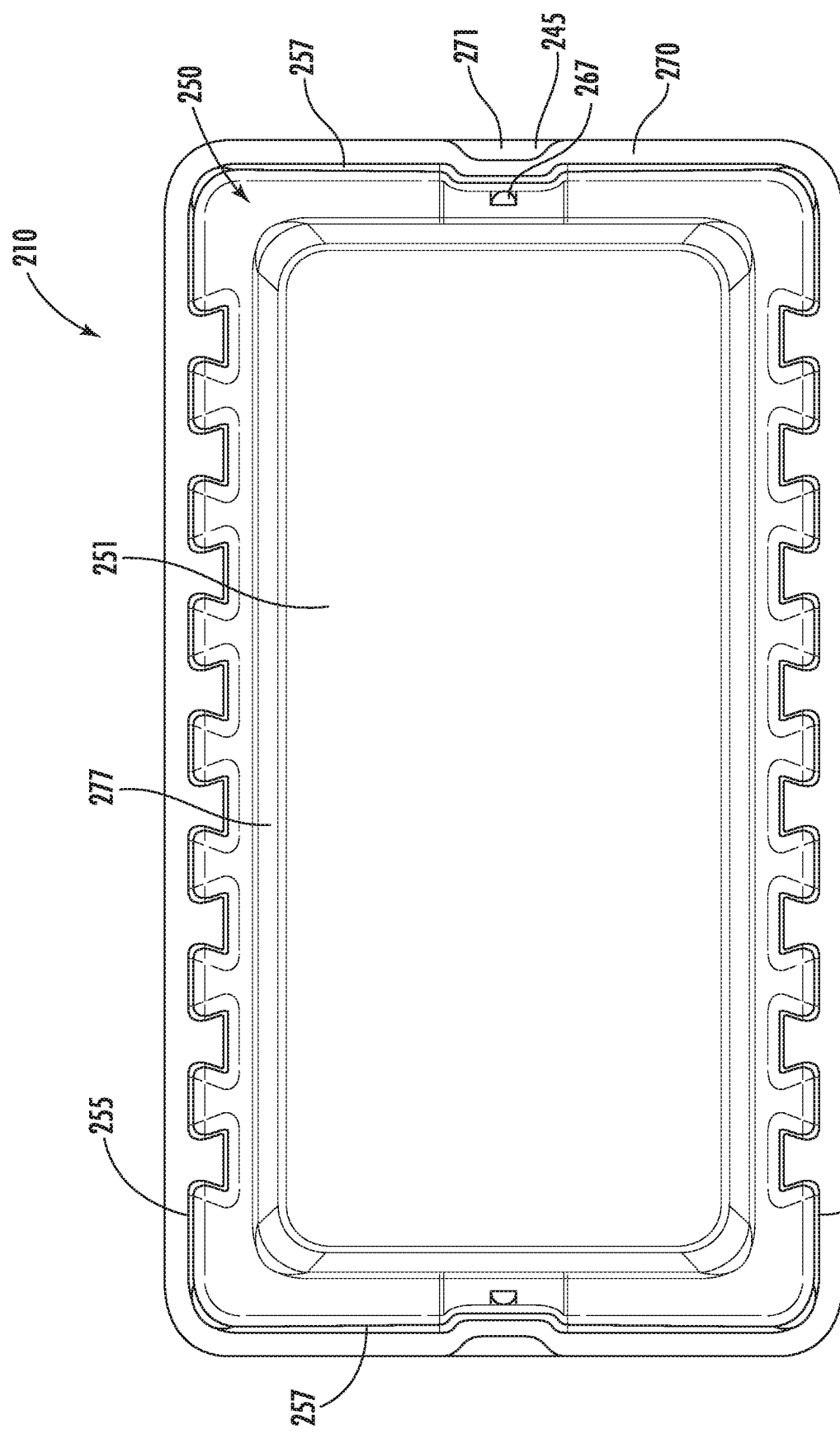
FIG. 14 is a top view of the packaging container of FIG. 12 in a closed state.
Figure 15:
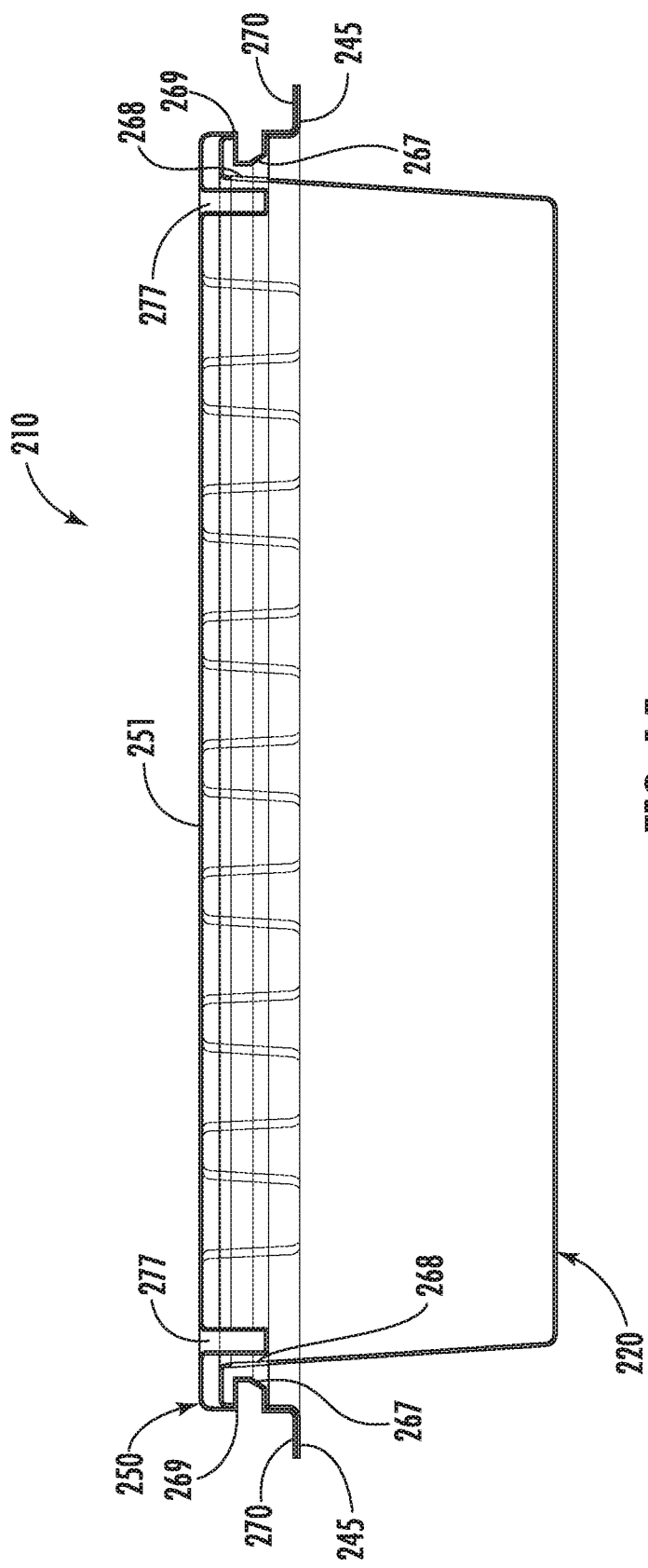
FIG. 15 is a cross sectional view of the packaging container of FIG. 14.
Figure 16:
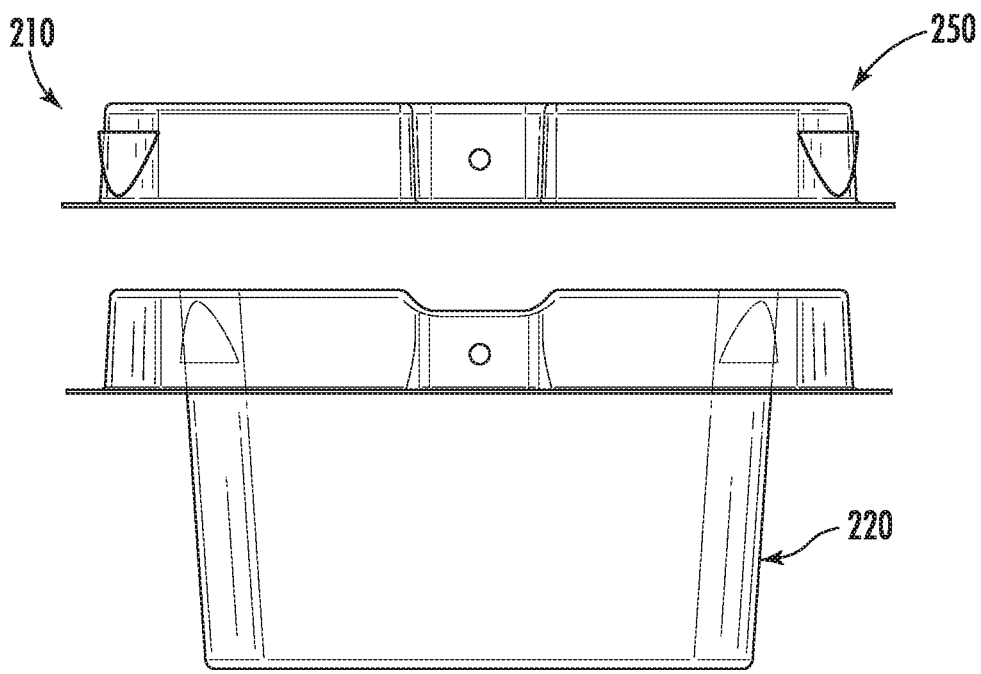
FIG. 16 is an end view of the packaging container of FIG. 12 in an open state.

A pair of closure and release mechanisms is also included in packaging container 210. For the sake of brevity, only one closure and release mechanism will be discussed. As shown in FIGS. 14 and 15, post 267 projects inwardly from cover end wall 257. In one embodiment, post 267 includes an angled edge and a top edge. Post 267 is adapted to engage corresponding inner and outer apertures 268 and 269 of base section 220. A peripheral flange 270 extends horizontally from a perimeter of cover section 250 such that, when packaging container 210 is in a closed position, peripheral flange 270 abuts a flange 245 of base section 220. Peripheral flange 270 includes a cut out area 271 (not shown in FIG. 14 or 15) to allow access for opening container 210.

Laterally extending flange 245 is deformable such that when flange 245 is depressed adjacent to cut out area 271, outer base end walls 236 and inner base end walls 235 move inwardly away from cover end wall 257, thereby releasing post 267 from the apertures and opening packaging container 210. Cut out area 271 provides unobstructed access for depressing deformable flange 245 for opening packaging container 210.

Figure 17:
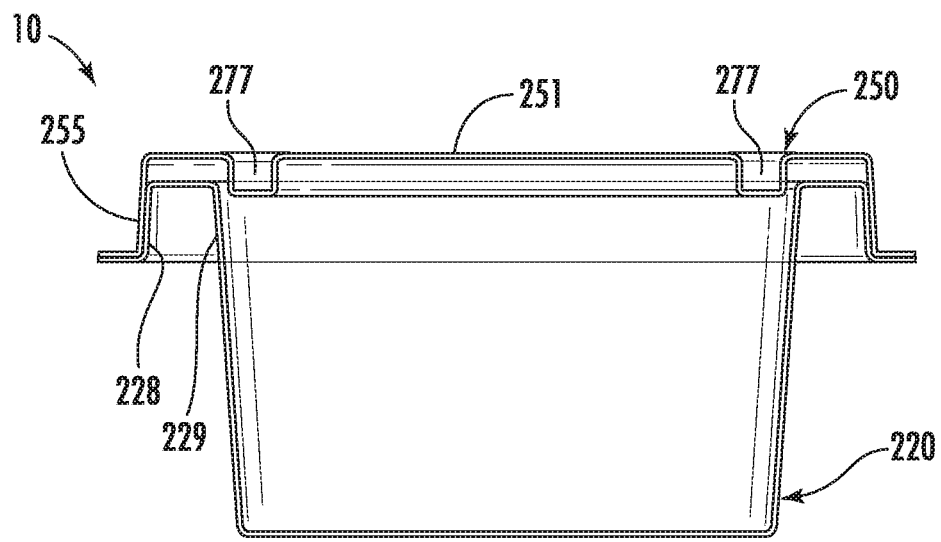
FIG. 17 is a cross-sectional view of the packaging container of FIG. 16 in a closed state.

As shown in FIGS. 15 and 17, container 210 includes a recessed channel 277 for providing structural support to container 210. Alternatively, top surface 251 may be recessed to provide structural support. Lettering (not shown) on top surface 251 may also provide additional structural support. Recessed channel 277 functions to prevent outer base side walls 228 and inner base side walls 229 from being pushed inward away from cover side wall 255, thereby preventing a deflection of the side walls and release of the zipper. Further, in some embodiments, recessed channel 277 may extend to a depth that prevents deflection of outer base end wall 236 (not shown in FIG. 16) and inner base end wall 237 (not shown in FIG. 16). The recessed channel 277 would function as an obstructive member that would prevent the container from opening via depression of flange 245 and deflection of walls 236 and 237. This would essentially result in a container that must be destroyed in order to be opened. That is, if recessed channel 277 extends adjacent to aperture 269 of inner base end wall 237, movement of inner base end wall 237 is hindered by recessed channel 277. Therefore, post 267 (not shown in FIG. 16 or 17) is not released from apertures 268 and 269 (not shown in FIG. 16 or 17) and cover section 250 remains secured in a closed position over base section 220.

Although not shown, container 210 may be adapted to retain an object similar to container 10. Corresponding detents and ribs may be included, as well as openings for pests.

Figure 18:
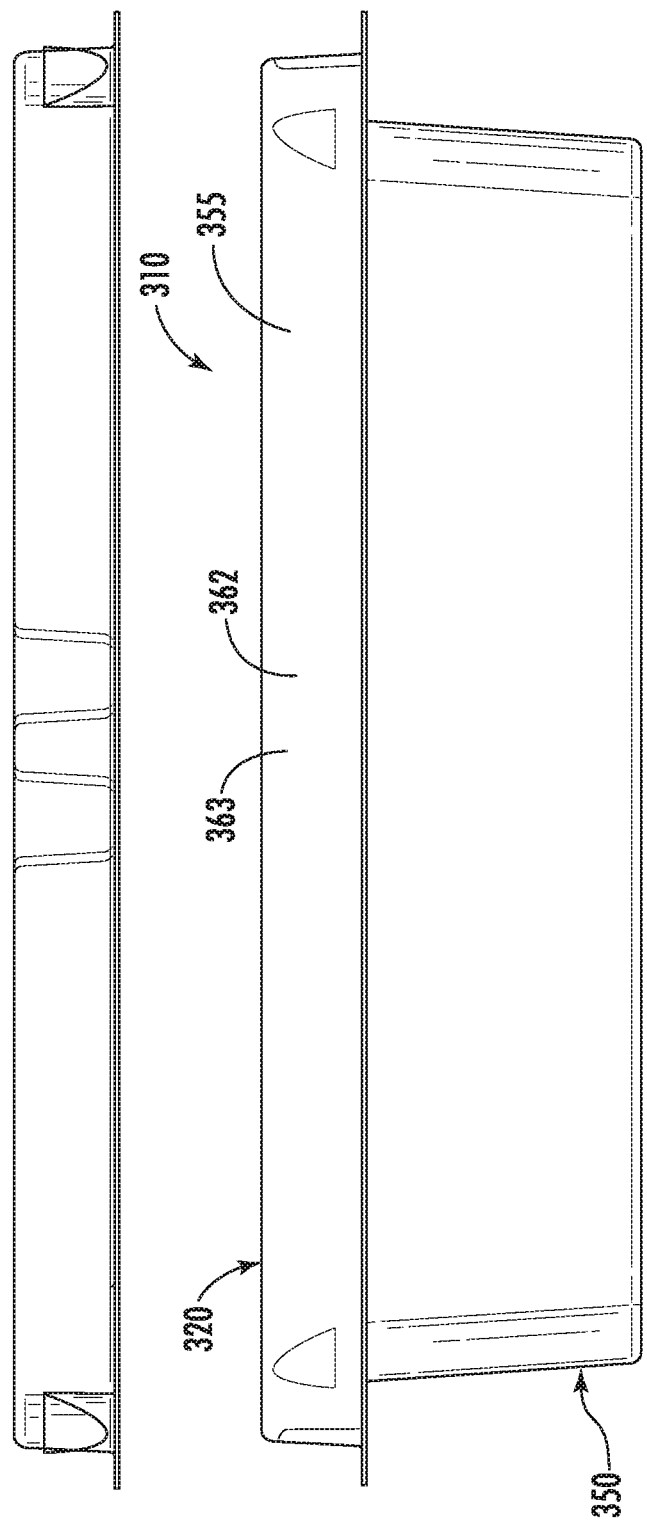
FIG. 18 is a side view of an alternate packaging container in an open configuration.

Further embodiments may include fewer or more indentations and protrusions, such as packaging container 310, as shown in FIGS. 18-19. Packaging container 310 includes elements corresponding to those described with respect to container 210 and will not be repeated herein. However, packaging container 310 includes base 320 with outer base side walls 336 (not shown in FIG. 18 or 19), having a pair of indentations 322 and a single protrusion 323. Similarly, cover section 350 includes protrusions 363 and a corresponding indentation 362 formed in cover side walls 355 for engaging with indentations and protrusions 322 and 323 of base 320.

As discussed above, with respect to container 210, when cover 350 is placed onto base section 320, indentations and protrusions 362, 363 of cover section 350 meet with indentations and protrusions 332, 333 of base section 320. Each indentation 362 of cover 350 fits into a corresponding protrusion 333 on base section 350 and each protrusion 363 of cover 350 fits into a corresponding indentation 322 of base section 320. Thus, when cover 350 is closed onto base section 320, protrusions 332 and 362 and indentations 333 and 363 form a zippered relationship between base section 320 and cover 350 when container 310 is in a closed state. Cover indentations and protrusions 362, 363 and base indentations and protrusions 332, 333 may have actuate side walls, but may also have straight walls. It should be understood that greater or fewer indentations and protrusions may be used.

The zippered relationship of indentations and protrusions 332, 333 and 362, 363 not only aids in maintaining cover 350 securely fastened onto base section 320, it contributes to the overall strength of container 310. That is, upon applying lateral pressure to outer base side wall 229, container 310 is not easily opened due to the function of the zipper. Thus, the zippered relationship between base section 320 and cover 350 contributes to the overall tamper-proof qualities of container 310.

Although the present invention has been described with reference to the embodiments and the accompanying drawings, it is not limited to the embodiments and the drawings. It should be understood that various modifications and changes can be made by those skilled in the art without departing from the spirit and scope of the present invention defined by the accompanying claims.

The invention claimed is:

1. A thermoformed packaging container comprising:
  a base section having a bottom surface, first and second inner and outer base side walls, and first and second inner and outer base end walls forming a chamber, with at least one outer base side wall having a plurality of base indentations and protrusions formed therein;
  a cover section having a top surface, first and second cover side walls, and first and second cover end walls, said cover section adapted to cover said base section when in a closed state, with at least one of said cover side walls having a plurality of cover indentations and protrusions formed therein for engaging with the plurality of base indentations and protrusions;

said plurality of base indentations and protrusions and said plurality of cover indentations and protrusions being configured such that when said cover section covers said base section in a closed state, each indentation of said cover section fits into a corresponding protrusion on said base section, and each protrusion of said cover section fits into a corresponding indentation of said base section, in a zippered relationship; and a closure mechanism for securing the container in a closed position, wherein said closure mechanism is formed within said first and second inner and outer base end walls and a corresponding cover end wall.

2. The thermoformed packaging container of claim 1 wherein each of said first and second outer base side walls, and first and second outer base end walls has a deformable flange extending therefrom.

3. The thermoformed packaging container of claim 2 wherein the closure mechanism includes at least one outer aperture formed within at least one of said outer base end walls and at least one inner aperture formed within at least one inner base end wall aligned with said at least one outer aperture, at least one projection extending inwardly from at least one cover end wall for engaging the at least one outer aperture and being adapted to engage the at least one inner aperture of the base section, said closure mechanism retaining the cover section over the base section and securing the packaging container in a closed position and wherein the at least one projection is released from the at least one inner aperture and the at least one inner aperture by depressing the deformable flange, thereby opening the packaging container.

4. The thermoformed packaging container of claim 1 wherein the top surface of the cover section has a peripheral rib formed therein for preventing inward deflection of said first and second outer base side walls.

5. The thermoformed packaging container of claim 1 wherein the chamber includes detents formed therein for retaining an object against said bottom surface.

6. The thermoformed packaging container of claim 5 wherein the chamber includes a rib formed within the bottom surface for further retaining the object.

7. A thermoformed packaging container comprising:
a base section having a bottom surface, first and second inner and outer base side walls, and first and second inner and outer base end walls forming a chamber, with at least one outer base one side wall having a plurality of base indentations and protrusions formed therein;
a cover section having a top surface, first and second cover side walls, and first and second cover end walls, said cover section adapted to cover said base section when in a closed state, with at least one of said cover side walls having a plurality of cover indentations and protrusions formed therein for engaging with the plurality of base indentations and protrusions;
said plurality of base indentations and protrusions and said plurality of cover indentations and protrusions being configured such that when said cover section covers said base section in a closed state, each indentation of said cover section fits into a corresponding protrusion on said base section, and each protrusion a said cover section fits into a corresponding indentation of said base section, in a zippered relationship;
a closure mechanism for securing the container in a closed position, wherein said closure mechanism is formed within said first and second inner and outer base end walls and a corresponding end wall of the cover section; and, detents formed within the chamber for retaining an object against said bottom surface.

8. The thermoformed packaging container of claim 7 wherein each of said first and second outer base side walls, and first and second outer base end walls has a deformable flange extending therefrom.

9. The thermoformed packaging container of claim 8, wherein the closure mechanism includes at least one outer aperture formed within at least one of said outer base end walls and at least one inner aperture formed within at least one inner base end wall aligned with said at least one outer aperture, at least one projection extending inwardly from at least one cover end wall for engaging the at least one outer aperture and being adapted to engage the at least one inner aperture of the base section, said closure mechanism retaining the cover section over the base section and securing the packaging container in a closed position and wherein the at least one projection is released from the at least one inner aperture and the at least one inner aperture by depressing the deformable flange, thereby opening the packaging container.

10. The thermoformed packaging container of claim 7 wherein the top surface of the cover section has a peripheral rib formed therein for preventing inward deflection of said first and second outer base side walls.

11. The thermoformed packaging container of claim 7 wherein the chamber includes a rib formed within the bottom surface for further retaining the object.

12. A thermoformed packaging container comprising:
a base section having a bottom surface, first and second inner and outer base side walls, and first and second inner and outer base end walls forming a chamber, with at least one outer base one side wall having a plurality of base indentations and protrusions formed therein;
a cover section having a top surface, first and second cover side walls, and first and second cover end walls, said cover section adapted to cover said base section when in a closed state, with at least one of said cover side walls having a plurality of cover indentations and protrusions formed therein for engaging with the plurality of base indentations and protrusions;
said plurality of base indentations and protrusions and said plurality of cover indentations and protrusions being configured such that when said cover section covers said base section in a closed state, each indentation of said cover section fits into a corresponding protrusion on said base section, and each protrusion of said cover section fits into a corresponding indentation of said base section, in a zippered relationship; and a closure mechanism for securing the container in a closed position, wherein said closure mechanism is formed within said first and second inner and outer base end walls and a corresponding end wall of the cover section, wherein each of said first and second outer base side walls, and first and second outer base end walls has a deformable flange extending therefrom, and the closure mechanism includes at least one outer aperture formed within at least one of said outer base end walls and at least one inner aperture formed within at least one inner base end wall aligned with said at least one outer aperture, at least one projection extending inwardly from at least one cover end wall for engaging the at least one outer aperture and being adapted to engage the at least one inner aperture of the base section, said closure mechanism retaining the cover section over the base section and securing the packaging container in a closed position and wherein the at least one projection is released from the at least one inner aperture and the at least one inner aperture by depressing the deformable flange, thereby opening the packaging container.

13. The thermoformed packaging container of claim 12 wherein the top surface of the cover section has a peripheral rib formed therein for preventing inward deflection of said first and second outer base side walls.

14. The thermoformed packaging container of claim 12 wherein the chamber includes detents formed therein for retaining an object against said bottom surface.

15. The thermoformed packaging container of claim 14 wherein the chamber includes a rib formed within the bottom surface for further retaining the object.

\* \* \* \* \*